(12) United States Patent
Tabata

(10) Patent No.: US 10,809,815 B2
(45) Date of Patent: Oct. 20, 2020

(54) DISPLAY APPARATUS

(71) Applicant: SHARP KABUSHIKI KAISHA, Sakai, Osaka (JP)

(72) Inventor: Shinji Tabata, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 98 days.

(21) Appl. No.: 16/107,211

(22) Filed: Aug. 21, 2018

(65) Prior Publication Data

US 2019/0064935 A1 Feb. 28, 2019

(30) Foreign Application Priority Data

Aug. 25, 2017 (JP) ................. 2017-162105

(51) Int. Cl.
| | | |
|---|---|---|
| G06F 3/03 | (2006.01) | |
| G02F 1/1333 | (2006.01) | |
| G02F 1/1335 | (2006.01) | |
| G06F 1/16 | (2006.01) | |
| G02F 1/133 | (2006.01) | |

(52) U.S. Cl.
CPC ........ *G06F 3/0304* (2013.01); *G02F 1/13336* (2013.01); *G02F 1/13338* (2013.01); *G02F 1/133308* (2013.01); *G02F 1/133524* (2013.01); *G06F 1/1601* (2013.01); *G02F 2001/13312* (2013.01); *G02F 2001/13332* (2013.01); *G02F 2001/133317* (2013.01); *G02F 2001/133331* (2013.01); *G02F 2201/07* (2013.01); *G02F 2201/50* (2013.01)

(58) Field of Classification Search
CPC ........... G02F 1/133308; G02F 1/13336; G02F 1/13338; G02F 1/133524; G02F 2001/13312; G02F 2001/133317; G02F 2001/13332; G02F 2001/133331; G02F 2201/07; G02F 2201/50; G06F 1/1601; G06F 3/0304

See application file for complete search history.

(56) References Cited

U.S. PATENT DOCUMENTS

| | | | | |
|---|---|---|---|---|
| 9,514,661 | B2 * | 12/2016 | Riegel | G02F 1/133615 |
| 2008/0165310 | A1 * | 7/2008 | Senoue | H04B 10/1141 349/116 |
| 2009/0168456 | A1 * | 7/2009 | Park | G02B 6/0068 362/613 |
| 2009/0225567 | A1 * | 9/2009 | Mori | G02F 1/133615 362/612 |

(Continued)

FOREIGN PATENT DOCUMENTS

JP 2014-127900 A 7/2014

*Primary Examiner* — Amy Onyekaba
(74) *Attorney, Agent, or Firm* — ScienBiziP, P.C.

(57) ABSTRACT

There is provided a display guidance apparatus including a liquid crystal display apparatus and a protective glass unit. A light receiving sensor is provided inside the liquid crystal display apparatus. The protective glass unit disposed to face a front surface side of a front casing frame of the liquid crystal display apparatus includes protective glass having a buffer member attached to the peripheral edge thereof. A light guide film is provided in a gap between the buffer member and the front surface side of the front casing frame, and an end surface at one end thereof is exposed from the gap to a display surface side of the liquid crystal display apparatus.

16 Claims, 16 Drawing Sheets

(56) References Cited

U.S. PATENT DOCUMENTS

| | | | | |
|---|---|---|---|---|
| 2010/0052192 | A1* | 3/2010 | Hasegawa | H01L 27/14685 |
| | | | | 257/797 |
| 2011/0273905 | A1* | 11/2011 | Lin | G02B 6/0068 |
| | | | | 362/607 |
| 2012/0188789 | A1* | 7/2012 | Masuji | G02B 6/0068 |
| | | | | 362/602 |
| 2012/0320622 | A1* | 12/2012 | Sanders | G09F 13/04 |
| | | | | 362/602 |
| 2013/0026340 | A1* | 1/2013 | Kanamori | H01H 13/86 |
| | | | | 250/200 |
| 2014/0354888 | A1* | 12/2014 | Nakamura | G06F 1/1632 |
| | | | | 348/725 |
| 2016/0132174 | A1* | 5/2016 | Yoo | G06F 3/04883 |
| | | | | 345/173 |
| 2016/0341890 | A1* | 11/2016 | Zhang | G02B 6/0055 |
| 2017/0005116 | A1* | 1/2017 | Ambekar | H01L 27/1248 |
| 2017/0038526 | A1* | 2/2017 | Matsumoto | G02B 6/0031 |
| 2017/0176787 | A1* | 6/2017 | Jia | G02F 1/133308 |
| 2018/0164638 | A1* | 6/2018 | Yoon | G06K 9/0004 |
| 2018/0211362 | A1* | 7/2018 | Choi | G02F 1/133308 |

* cited by examiner

DISPLAY APPARATUS

BACKGROUND

1. Field

The present disclosure relates to a display apparatus that displays an image, and more particularly to a display apparatus including a light receiving unit for receiving light emitted from a remote controller.

2. Description of the Related Art

In recent years, a display guidance apparatus (display apparatus) in which a display unit is embedded is installed in a concourse such as a department store, a shopping mall, an airport, a station, and the like. In this type of display guidance apparatus, only the display screen of the display unit is exposed on the surface, and the casing frame of the display unit is hidden inside the housing of the display guidance apparatus. The display guidance apparatus has a function of setting the OSD of a display unit and a function of outputting the operation log of the display guidance apparatus, and these functions are realized by a remote controller operated by a user. The remote controller outputs an operation signal on light and the display guidance apparatus is provided with a receiving device for receiving this light.

Japanese Unexamined Patent Application Publication No. 2014-127900 discloses, as an example of a display apparatus including a light receiving device, a configuration in which a light guide window is provided in a casing frame of a display panel and light from a remote controller incident on the light guide window may be received.

SUMMARY

In a case where a remote-control operation is performed on a display guidance apparatus described above, it is preferable to form a light guide window on the outer wall of the housing for allowing light from a remote controller to be incident inside. However, forming the light guide window on the outer wall of the housing is undesirable because the appearance of the display guidance apparatus is impaired. In addition to the display screen of a display unit, the light receiving surface of a light receiving device may be exposed on the surface, but also, in this case, the appearance of the display guidance apparatus is impaired. In addition, in a case where the light guide window is formed on the outer wall of the housing, dust, water droplets, moisture enter the inside of the light guide window and there is a possibility that the electric device inside is broken. Such a problem is not limited to the display guidance apparatus but may similarly occur in a display apparatus including a light guide window in the casing frame of the display panel.

On the other hand, by providing an outer door on the housing and releasing the outer door at the time of remote-control operation, the light of the remote controller may be incident on the light receiving device without impairing the external appearance of the display guidance apparatus. However, since the display guidance apparatus is installed in a place where there is a lot of traffic such as a concourse of a large-sized facility or the like, in the case of opening the outer door, it is preferable to work so as not to interfere with a passerby. For example, it is preferable to take measures to secure the safety of a passerby by placing a display guide indicating that the apparatus is in operation, dividing the passage and the work area, or arranging security guards.

It is desirable to provide a display apparatus capable of displaying only the display surface on the surface of the apparatus and receiving the light of the remote controller without opening the cover or the door of the housing of the apparatus and without impairing the appearance of the apparatus.

According to an aspect of the disclosure, there is provided a display apparatus including a display unit, a light receiving unit, an opposing body, and a light guide member. The display unit includes a display panel that displays an image on a display surface. The light receiving unit is configured to receive light emitted from a remote controller. The opposing body is disposed to face the outer peripheral portion of the display unit with a gap between the opposing body and the outer peripheral portion. The light guide member is provided in the gap and extends toward the light receiving unit and is formed in a film shape. A first end of the light guide member on one side of an extending direction is exposed from the gap to the display surface side.

DESCRIPTION OF THE EMBODIMENTS

Figure 1:
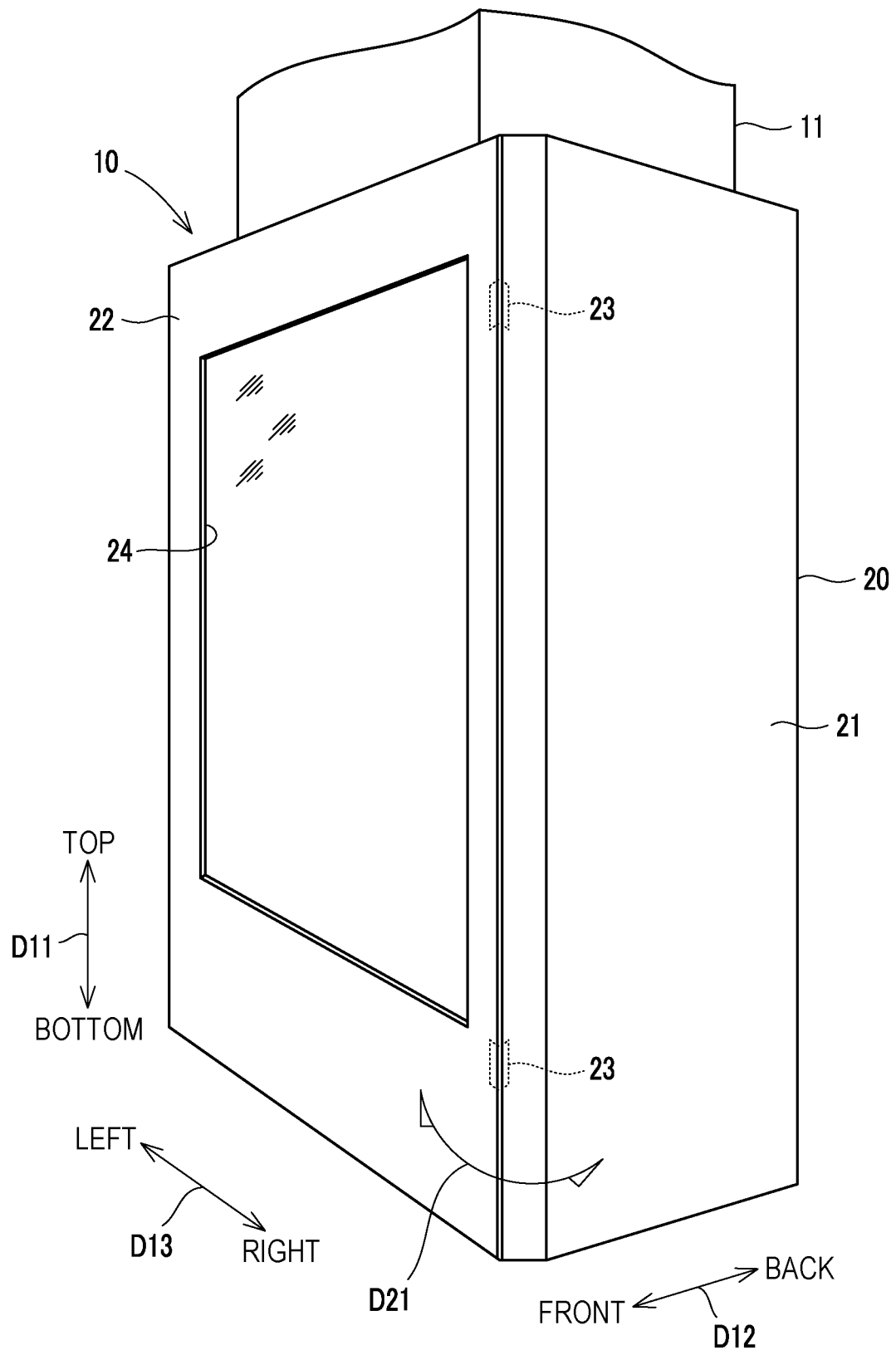
FIG. 1 is a perspective view showing a display guidance apparatus according to a first embodiment of the present disclosure.

Hereinafter, each embodiment of the present disclosure will be described with reference to drawings as appropriate. Each embodiment described below is merely an example of implementing the present disclosure and does not limit the technical scope of the present disclosure. In the following description, a top-bottom direction D11, a front-back direction D12, and a left-right direction D13 shown in each drawing are used. In addition, in the description of a second embodiment and the following, the same reference numerals as those of a first embodiment denote the same configurations as those of the first embodiment, the description thereof will be omitted, and overlapping descriptions of operations and effects will be omitted.

First Embodiment

FIG. 1 is a perspective view showing a display guidance apparatus 10 (an example of a display apparatus of the present disclosure) according to a first embodiment of the present disclosure. The display guidance apparatus 10 is an electronic guide display apparatus installed in a concourse such as a department store, a shopping mall, an airport, a station and an apparatus that displays and provides the floor guide, shop information, peripheral area information, and the like of a facility to a user of the facility.

As shown in FIG. 1, the display guidance apparatus 10 is provided on a wall surface 11 such as a pillar of a facility in a concourse. The display guidance apparatus 10 generally includes a cabinet 20 (an example of an outer housing of the present disclosure) and a display unit 30 (see FIG. 2) accommodated inside the cabinet 20.

Figure 2:
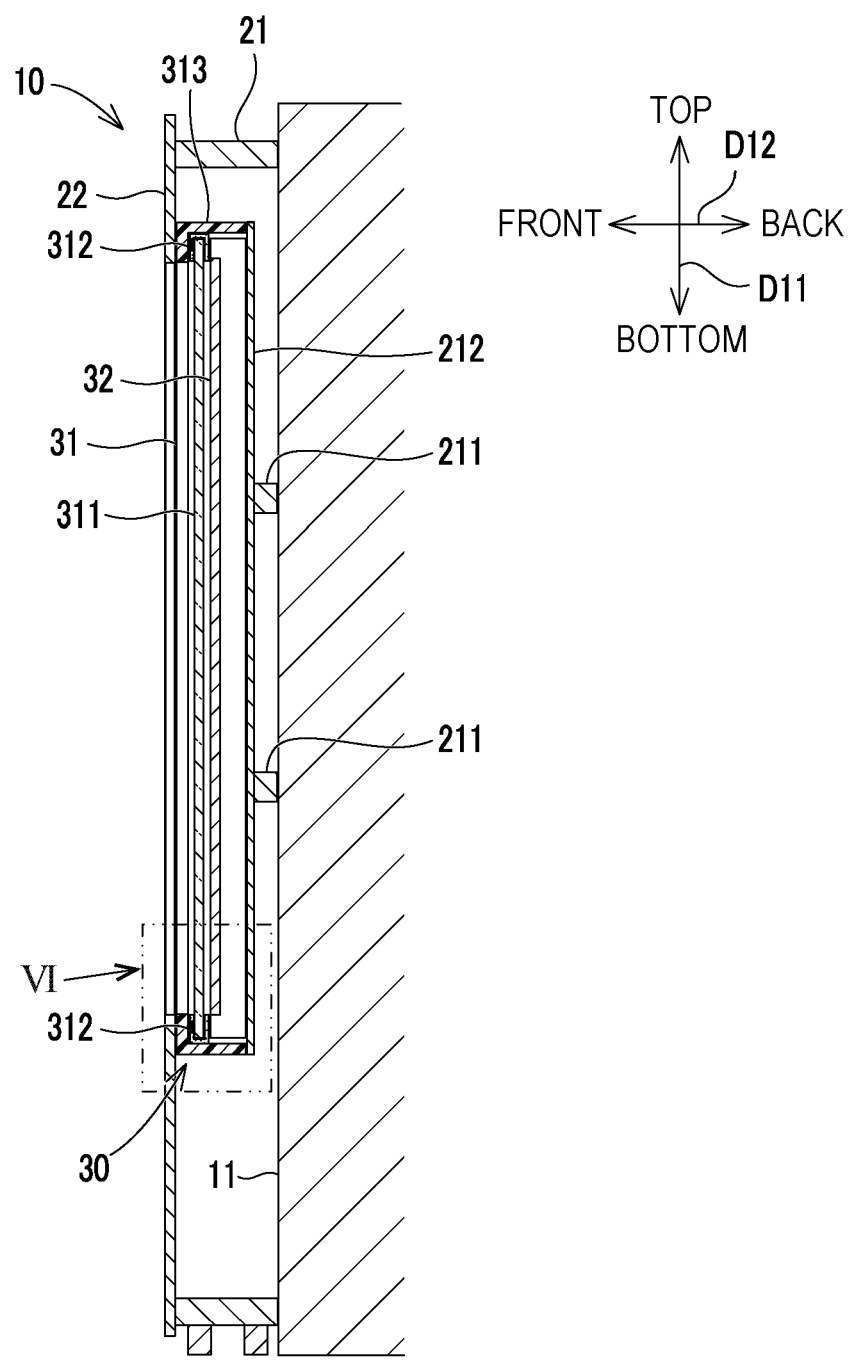
FIG. 2 is a cross-sectional view showing a sectional structure of the display guidance apparatus.

As shown in FIGS. 1 and 2, the cabinet 20 supports a display unit 30 (see FIG. 2) in a state of being embedded therein and includes a main body housing 21 and an outer door 22 attached to a front surface side of the main body housing 21. The main body housing 21 is made of sheet metal and is formed so as to surround a pillar along the wall surface 11. As shown in FIG. 2, the main body housing 21 includes a plurality of stays 211 fixed to the wall surface 11, and a support plate 212 fixed to the stays 211. The display unit 30 is attached to the support plate 212.

As shown in FIG. 1, the outer door 22 is attached to the main body housing 21 so as to be opened and closed in the direction of an arrow D21 in the drawing with the right end portion of the front surface side of the main body housing 21 as the center of rotation. The outer door 22 is rotatably supported with respect to the main body housing 21 by an inner hinge 23 provided inside the main body housing 21 so as not to impair the appearance of the front surface side of the display guidance apparatus 10. In addition, in order not to impair the appearance, except for an opening 24 to be described later, the surface of the outer door 22 is not subjected to processing, and no handle, keyhole, or the like is provided.

On the front surface side of the outer door 22 of the cabinet 20, a rectangular large vertically-elongated opening 24 is formed. The opening 24 is for exposing a display surface 3211 of the display unit 30 to the outside. A user may acquire the information displayed on the display unit 30 from the opening 24.

Figure 3:
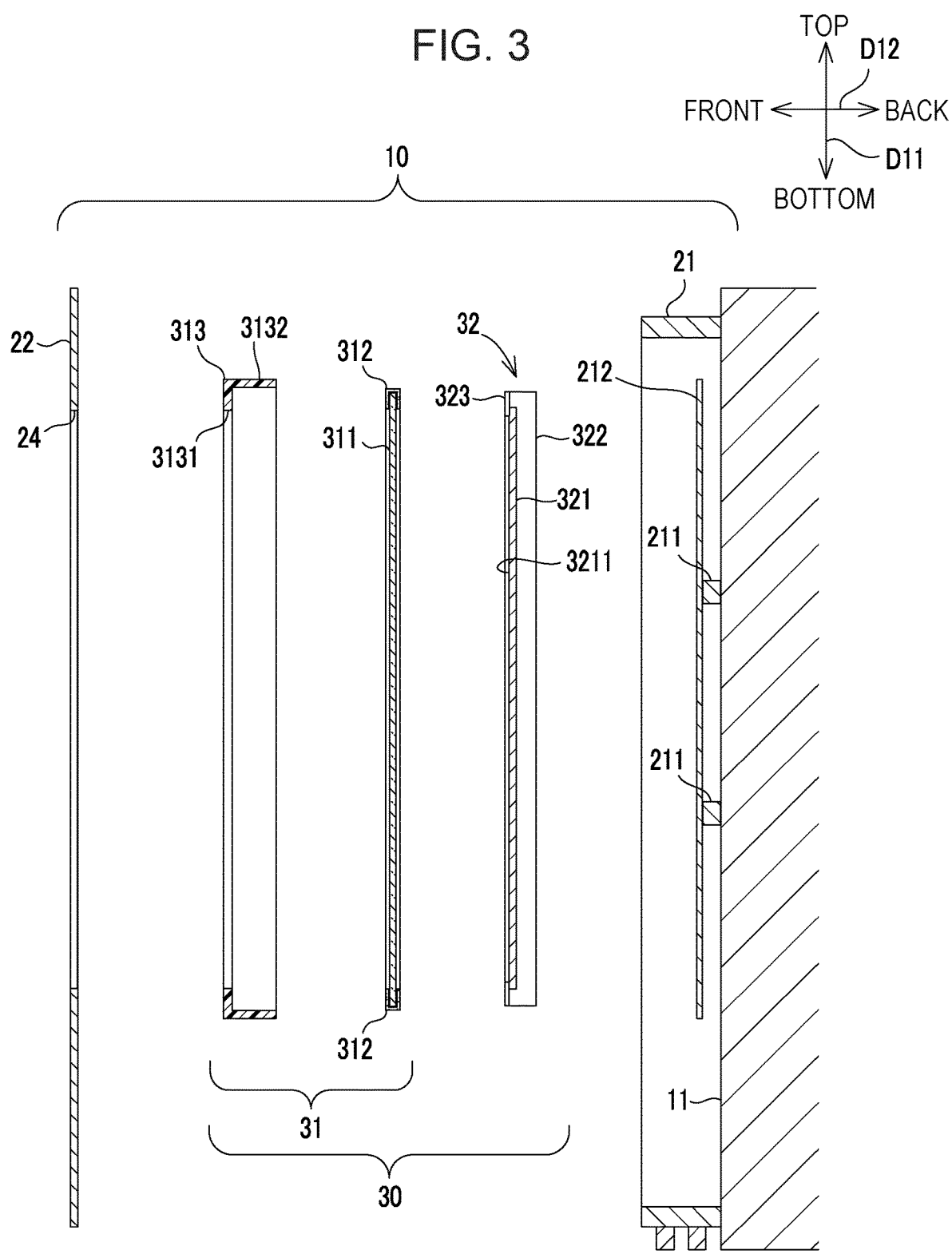
FIG. 3 is an exploded view showing each configuration of the display guidance apparatus.
Figure 4:
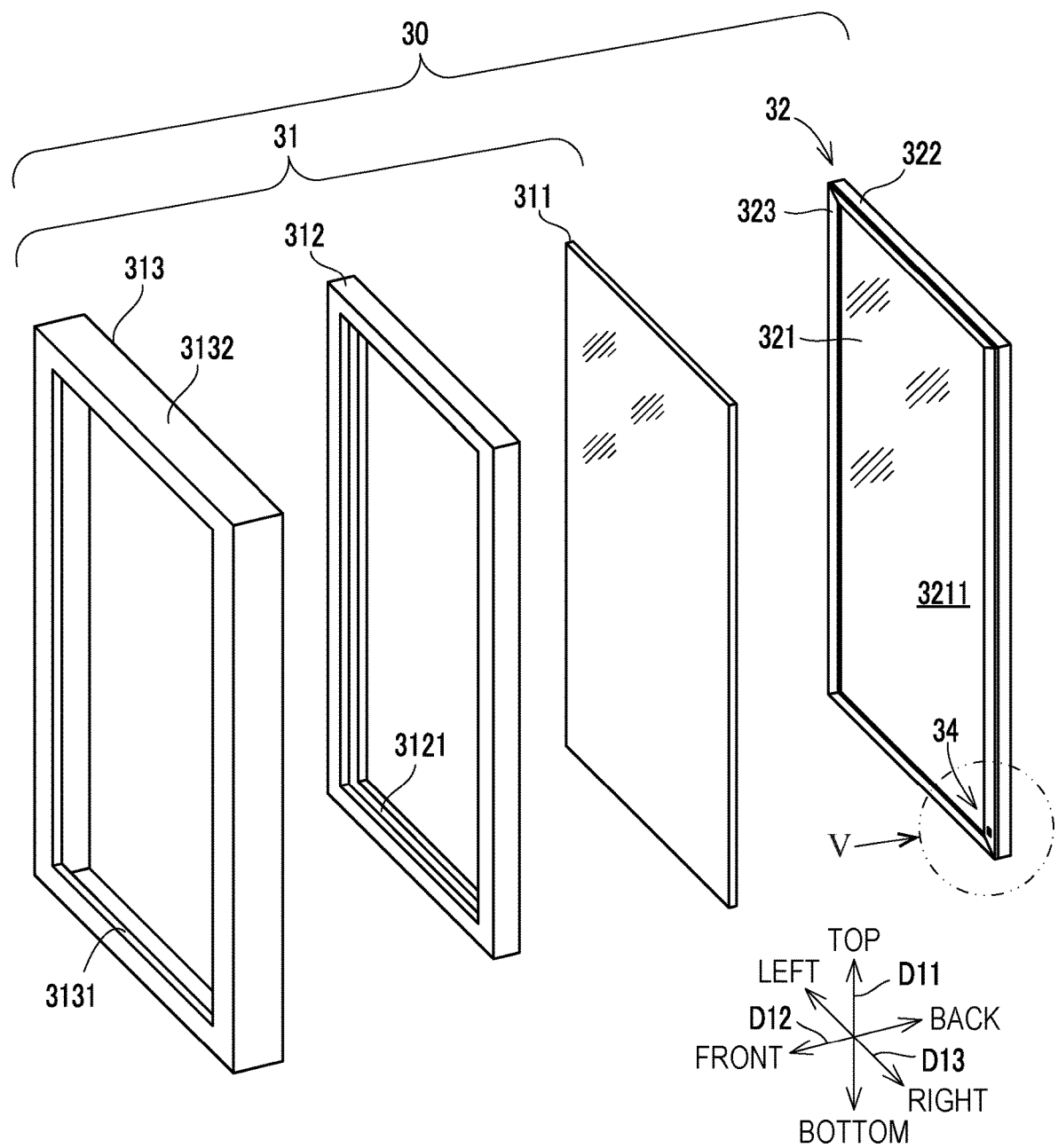
FIG. 4 is an exploded perspective view showing a protective glass unit and a liquid crystal display apparatus included in the display guidance apparatus.

FIG. 2 is a longitudinal sectional view of a central portion of the display guidance apparatus 10, and FIG. 3 is an exploded view of the display guidance apparatus 10. In addition, FIG. 4 is an exploded perspective view of the display unit 30. As shown in FIGS. 2 and 3, the display unit 30 includes a protective glass unit 31 (an example of an opposing body of the present disclosure) and a liquid crystal display apparatus 32 (an example of a display unit of the present disclosure).

As shown in FIGS. 3 and 4, the liquid crystal display apparatus 32 includes a liquid crystal display 321 (an example of a display panel of the present disclosure), a support frame 322, a front casing frame 323 (an example of a frame of the present disclosure), an LCD driver (not shown), a backlight (not shown), and the like. The liquid crystal display 321 displays image information such as characters, still images, moving images, videos, and the like on the display surface 3211 according to the input signals, data, and the like. The liquid crystal display 321 has a structure in which a liquid crystal layer is enclosed in a pair of glass substrates and is a conventionally well-known display panel including a polarizing filter, an electrode, an alignment film, and the like. In the present embodiment, the liquid crystal display 321 using a liquid crystal technology is exemplified as an example of a display panel, but a display panel such as a plasma display or an organic EL display, for example, may be applied instead of the liquid crystal display 321.

As shown in FIG. 4, in the present embodiment, the liquid crystal display 321 formed in a rectangular shape is used. In the display guidance apparatus 10, the liquid crystal display 321 is embedded in a state where the longitudinal direction thereof is aligned with the top-bottom direction D11. The liquid crystal display 321 is disposed on the front surface side of the liquid crystal display apparatus 32. For example, the liquid crystal display 321 may include a touch panel that accepts touch operations by the user on the display surface 3211. In this case, the touch panel is disposed so as to overlap the display surface 3211.

The support frame 322 is a resin-molded article formed of a synthetic resin and is formed in a rectangular box shape. The support frame 322 is a housing on the back surface side of the liquid crystal display apparatus 32. The support frame 322 supports the liquid crystal display 321 in a state where the liquid crystal display 321 is accommodated. The front casing frame 323 is a resinous member that surrounds the peripheral edge of the front surface side of the liquid crystal display 321 and is formed in a frame shape (bezel shape). The front casing frame 323 is engaged with the outer peripheral edge on the front surface side of the support frame 322 so as to sandwich the peripheral edge of the liquid crystal display 321 therebetween. In this way, in the liquid crystal display apparatus 32, the liquid crystal display 321 is fixed. The above-described LCD driver (not shown), a backlight (not shown), and the like are also accommodated in the support frame 322.

The protective glass unit 31 is provided in front of the liquid crystal display apparatus 32. In the present embodiment, the protective glass unit 31 is disposed to face the front surface side of the front casing frame 323 of the liquid crystal display apparatus 32, specifically, is disposed so as to form a minute gap T1 (see FIG. 7) between the protective glass unit 31 and the front surface side of the front casing frame 323.

The protective glass unit 31 includes a protective glass 311 (an example of a glass plate of the present disclosure), a buffer member 312 (an example of a buffer member of the present disclosure), and a casing 313 (an example of a casing of the present disclosure). The protective glass 311 protects the display surface 3211 of the liquid crystal display 321 and is formed in a rectangular shape. The protective glass 311 is formed to have a size enough to cover the display surface 3211. As will be described later, the protective glass 311 is disposed so as to face the display surface 3211.

As shown in FIGS. 3 and 4, the buffer member 312 is attached to the peripheral edge of the protective glass 311. The buffer member 312 covers the entire periphery of the peripheral edge of the protective glass 311. The buffer member 312 is made of an elastic member such as a sponge or silicone rubber, for example. The buffer member 312 may be made of any material as long as the buffer member 312 may absorb shock and vibration. In the present embodiment, the buffer member 312 is formed in a rectangular frame shape. A groove 3121 (see FIG. 4) into which the peripheral edge of the protective glass 311 is inserted is formed on the inner peripheral surface of the buffer member 312. By inserting the peripheral edge of the protective glass 311 into the groove 3121, the buffer member 312 is attached so as to cover the peripheral edge of the protective glass 311.

The casing 313 supports the protective glass 311 together with the buffer member 312 and is, for example, a resin-molded article formed in a rectangular frame shape with a synthetic resin. An opening 3131 (see FIGS. 3 and 4) for exposing the protective glass 311 is formed on the front surface side of the casing 313. The casing 313 includes a peripheral wall 3132 erected backward from the outer peripheral edge thereof. As shown in FIG. 2, the casing 313 accommodates the protective glass 311 in a state where the buffer member 312 is attached to the space surrounded by the peripheral wall 3132 and also supports the protective glass 311 via the buffer member 312. In this way, the protective glass 311 is protected from shock, vibration and the like.

As shown in FIG. 2, the protective glass unit 31 is disposed to face the front surface side of the front casing frame 323 (see FIG. 3) of the liquid crystal display apparatus 32. Specifically, in the casing 313, the liquid crystal display apparatus 32 is accommodated in a space behind the protective glass 311. The liquid crystal display apparatus 32 is accommodated in the casing 313 in a state where the front surface side of the front casing frame 323 of the liquid crystal display apparatus 32 is in contact with the buffer member 312. That is, the casing 313 accommodates and supports the protective glass 311 and the liquid crystal display apparatus 32 in a state where the buffer member 312 is in contact with the peripheral edge of the front surface side of the liquid crystal display apparatus 32. As the buffer member 312 and the front surface side of the front casing frame 323 are brought into contact with each other, a light guide portion 34 to be described later (see FIGS. 5 and 6) provided in the front casing frame 323 is covered by the buffer member 312. For this reason, IR light L1 (infrared light) from a remote controller 52 (see FIG. 6) is blocked by the protective glass unit 31, and the IR light L1 does not directly reach the light guide portion 34.

In addition, the back-end portion of the peripheral wall 3132 (see FIG. 3) of the casing 313 is fixed to the support plate 212 in the main body housing 21 in a state where the protective glass 311 and the liquid crystal display apparatus 32 are accommodated in the casing 313.

Figure 5:
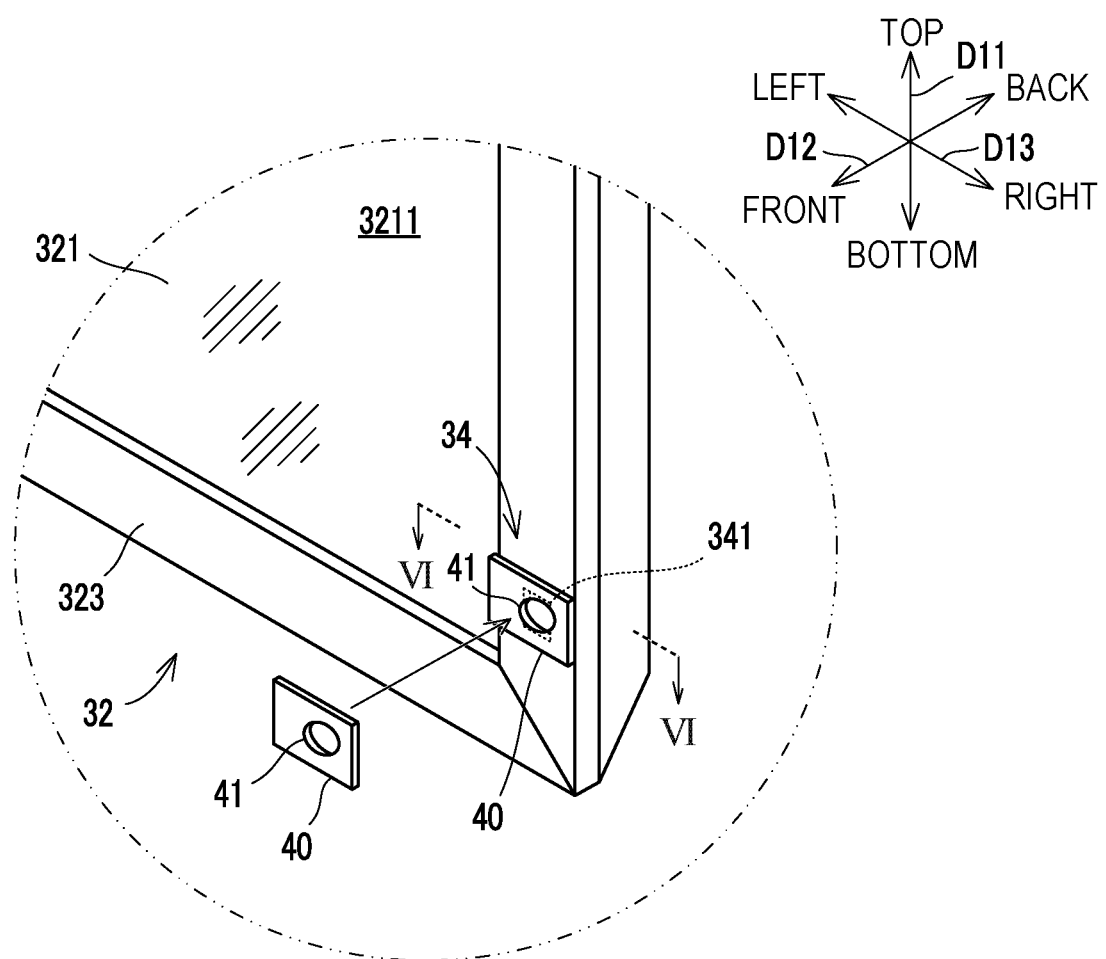
FIG. 5 is an enlarged view of a main portion V of FIG. 4, showing a light guide portion of a liquid crystal display apparatus.

FIG. 5 is an enlarged view of the main portion V of FIG. 4, which is an enlarged view of a lower right portion of the liquid crystal display apparatus 32. As shown in FIG. 5, the liquid crystal display apparatus 32 is provided with the light guide portion 34. The light guide portion 34 is composed of a rectangular light guide window 341 (an example of a light guide window of the present disclosure) and a light guide film 40 (an example of a light guide member of the present disclosure). The light guide window 341 is formed in the front casing frame 323 and is a through-hole penetrating the front casing frame 323. In FIG. 5, the light guide window 341 is indicated by a dotted line.

The light guide window 341 guides the IR light L1 emitted from the remote controller 52 (see FIG. 6) to a light receiving sensor 51 (see FIG. 6, an example of a light receiving unit of the present disclosure) provided inside the front casing frame 323.

As shown in FIG. 5, the light guide film 40 is provided on the surface of the front casing frame 323. The light guide film 40 is disposed in the gap T1 to be described later (see FIG. 7). The light guide film 40 is provided in the vicinity of the light guide window 341. Specifically, the light guide film 40 is provided on the surface of the front casing frame 323 so as to cover the light guide window 341. The light guide film 40 is a transparent resin film having a thickness of about 0.1 mm and is formed in a rectangular shape long in the left-right direction D13. The thickness of the light guide film 40 is not limited to the above-described size. The light guide film 40 is in the form of a film made of a transparent material and is capable of propagating the IR light L1 inside the material along the plane direction thereof. For example, as the light guide film 40, a film member formed of a transparent resin such as polycarbonate, polyvinyl chloride (PVC resin), polyethylene terephthalate (PET resin), acrylic or the like may be applied.

In the present embodiment, the light guide film 40 is adhered to the surface of the front casing frame 323 by an adhesive or the like. A circular hole 41 (an example of a hole portion of the present disclosure) is formed substantially at the center of the light guide film 40. The hole 41 is formed at a position corresponding to the light guide window 341 in the light guide film 40, specifically, the hole 41 is formed at a position where the hole 41 and the light guide window 341 overlap each other.

Figure 6:
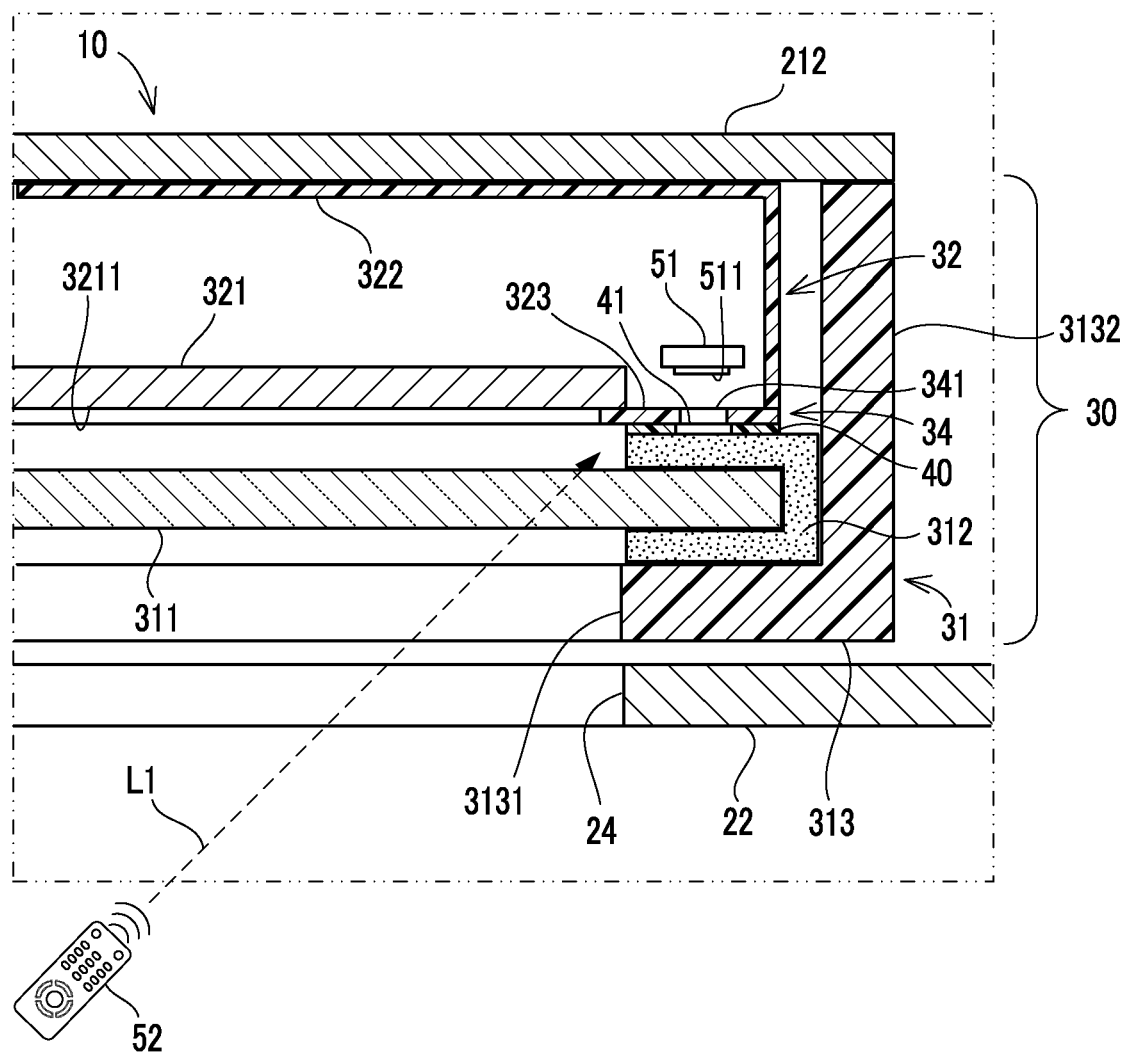
FIG. 6 is an enlarged view showing a configuration of the light guide portion of the display guidance apparatus.
Figure 7:
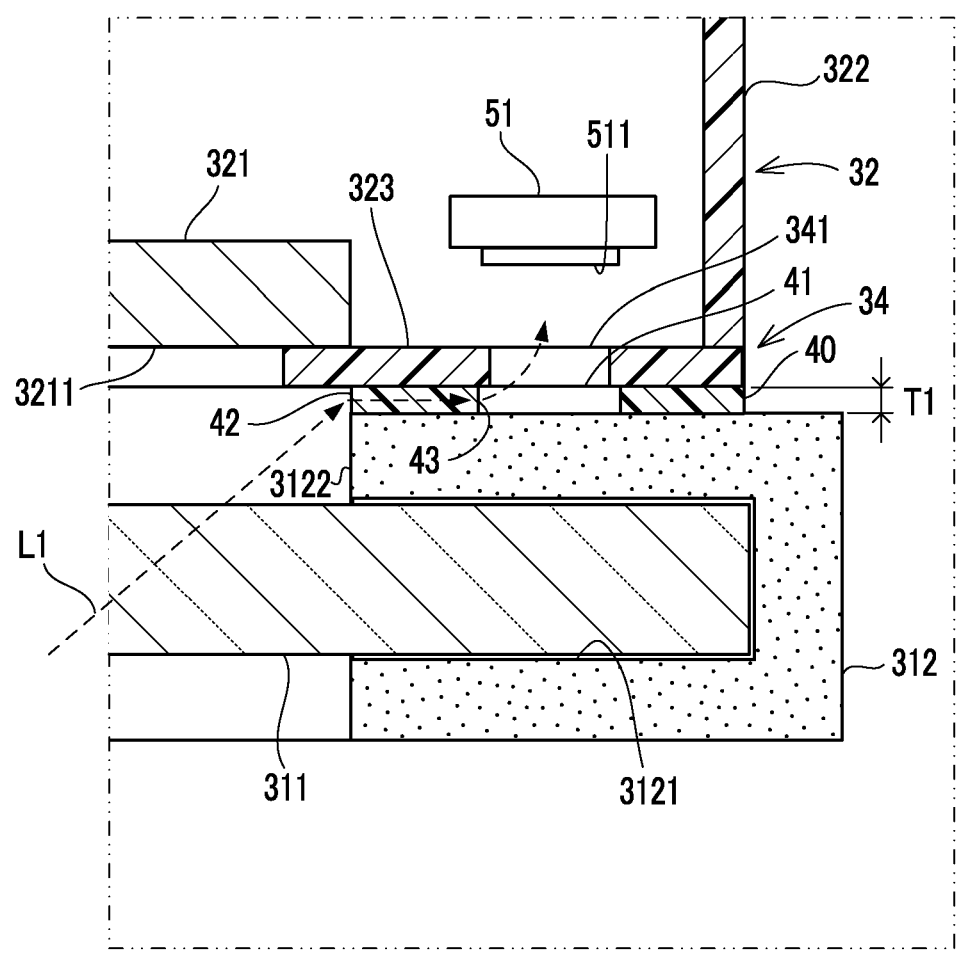
FIG. 7 is an enlarged view showing the configuration of the light guide portion and the progression of IR light incident on a light guide film of the first embodiment.

FIG. 6 is a cross-sectional view of the display guidance apparatus 10 taken along the line VI-VI in FIG. 5. FIG. 7 is an enlarged view enlarging the periphery of the light guide portion 34 in the sectional view of FIG. 6. In FIG. 7, illustration of the casing 313 and the outer door 22 is omitted. As shown in FIG. 6, the light receiving sensor 51 is provided on the back surface side of the light guide window 341. The light receiving sensor 51 is a sensor capable of receiving the IR light L1 incident inside from the light guide window 341 and is, for example, a phototransistor or the like. The light receiving sensor 51 is disposed so that a light receiving surface 511 faces the light guide window 341 and the IR light L1 incident from the light guide window 341 may be efficiently received. The light receiving sensor 51 is fixed to a bracket (not shown) in the support frame 322.

As shown in FIG. 7, the light guide film 40 is provided in the gap T1 between the buffer member 312 and the front surface side of the front casing frame 323 in a state where the protective glass 311 and the liquid crystal display apparatus 32 are accommodated in the casing 313. The light guide film 40 extends in the left-right direction D13 within the gap T1 and extends toward the light receiving sensor 51 along the front surface side of the front casing frame 323. Here, the gap T1 shown in FIG. 7 exists between the buffer member 312 and the front surface side of the front casing frame 323, but if the light guide film 40 is not provided, the buffer member 312 is expanded by the thickness of the light guide film 40 to fill the gap T1.

In the light guide film 40, the end surface 42 (one example of a first end of the present disclosure, see FIG. 7) on one side (left side) of the extending direction (left-right direction D13) of the light guide film 40 is a portion that receives the IR light L1 from the remote controller 52 and is an incident surface that guides the IR light L1 to the inside of the light guide film 40. In addition, an inner peripheral surface 43 (see FIG. 7) of the hole 41 is a portion from which the IR light propagated inside is emitted to the outside and is the emission surface of the IR light L1. The end surface 42 and the inner peripheral surface 43 are cut so as not to generate minute unevenness in order to suppress attenuation at the time of incidence and emission of the IR light L1.

The end surface 42 of the light guide film 40 is exposed from the gap T1 to the display surface 3211 side. In this case, the end surface 42 is disposed at the same position as a left end portion 3122 of the buffer member 312. That is, the end surface 42 of the light guide film 40 does not protrude to the left side from the left end portion 3122. Therefore, on the end surface 42, it is possible to receive the IR light L1 emitted from the remote controller 52 aiming at the end surface 42 and passing through the protective glass 311. When reaching the inner peripheral surface 43 of the hole 41, the IR light L1 is emitted from the inner peripheral surface 43 as diffused light to the outside of the hole 41 (see the broken line arrow in FIG. 7). A part of the IR light L1 emitted from the inner peripheral surface 43 is reflected directly or by being reflected by another member and heads toward the light receiving surface 511 of the light receiving sensor 51 and received by the light receiving sensor 51. In the present embodiment, a configuration in which the end surface 42 of the light guide film 40 does not protrude from the left end portion 3122 is exemplified, but if the aesthetic sensation from the front surface side of the display guidance apparatus 10 is not impaired, the end surface 42 may protrude slightly from the left end portion 3122 to the left side.

As described above, in the display guidance apparatus 10 of the present embodiment, the light guide film 40 is provided between the buffer member 312 and the front surface side of the front casing frame 323. Therefore, even if the light guide window 341 is closed by the buffer member 312, by operating the remote controller 52 toward the end surface 42 exposed from the gap T1, the IR light L1 emitted from the remote controller 52 may be incident on the end surface 42. The IR light L1 incident on the end surface 42 passes through the inside of the light guide film 40, reaches the inner peripheral surface 43, and is emitted from the inner peripheral surface 43. The IR light L1 emitted from the inner peripheral surface 43 may be received by the light receiving surface 511 of the light receiving sensor 51.

Since the IR light L1 may be received by the light receiving sensor 51 in this way, an operator of the remote controller 52 may operate the remote controller 52 without opening the outer door 22. In addition, since it is possible to operate the remote controller 52 without opening the outer door 22, the operation of the remote controller 52 may be continued without interfering with a passerby. In addition, since there is no need to form a hole for guiding the IR light L1 to the light receiving sensor 51 on the outer door 22, there is no problem of breakdown of internal devices due to dust, water droplets, or moisture entering through the hole. Furthermore, it is possible to maintain good appearance without impairing the appearance of the outer door 22. In particular, in a case where a make-up sheet (decorative sheet) for advertisement or design is applied to the surface of the main body housing 21 or the outer door 22 of the cabinet 20, it is possible to prevent a hole from being opened in the make-up sheet without impairing the appearance.

In the first embodiment described above, as an example of a display apparatus of the present disclosure, the display guidance apparatus 10 provided on the wall surface 11 such as a pillar of the concourse was exemplified, but the present disclosure is not limited to such a configuration. For example, the present disclosure may be applied to a display guidance apparatus such as a type suspended from a ceiling, a type fitted in a wall surface, a self-supporting type, or the like.

Figure 8:
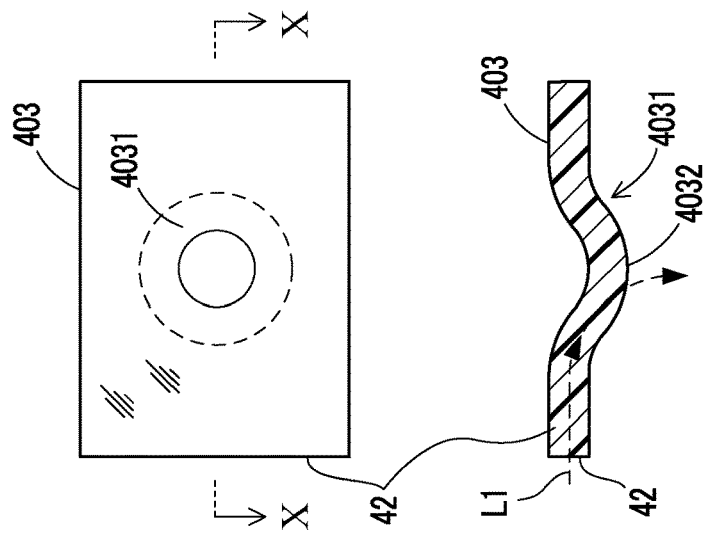
FIG. 8 is a view showing Modification Example 1 of the light guide film of the first embodiment.

In addition, in the above embodiment, the light guide film 40 is exemplified as an example of a light guide member of the present disclosure. However, instead of this light guide film 40, the light guide film 401 shown in FIG. 8 may be applied as Modification Example 1 of the light guide member. Here, the upper view of FIG. 8 is a front view of the light guide film 401, and the lower view is a cross-sectional view of the upper cutting line VII-VIII. As shown in FIG. 8, the light guide film 401 is made of the same material as that of the light guide film 40 and is formed in the same size. A circular hole 4011 (an example of a hole portion of the present disclosure) is formed substantially at the center of the light guide film 401. The inner peripheral surface 4012 of the hole 4011 is formed in a divergent shape toward the light guide window 341 in the thickness direction, specifically, is tapered. In this way, the IR light L1 incident on the light guide film 401 and reaching the inner peripheral surface 4012 is polarized toward the light guide window 341 side in accordance with a taper angle of the inner peripheral surface 4012 and heads toward the light receiving sensor 51. In this way, the light receiving sensor 51 may efficiently receive the IR light L1.

Figure 9:
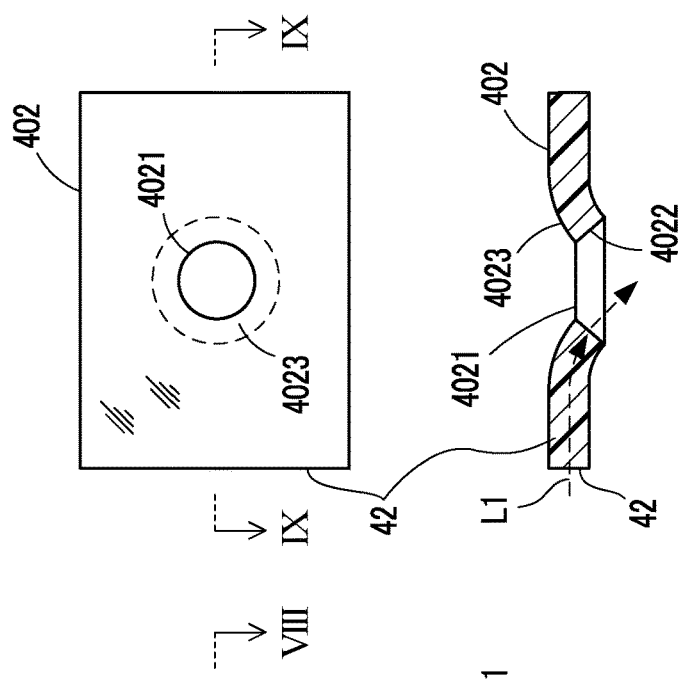
FIG. 9 is a view showing Modification Example 2 of the light guide film of the first embodiment.

In addition, instead of the light guide film 40, a light guide film 402 shown in FIG. 9 may be applied as Modification Example 2 of the light guide member. Here, the upper view of FIG. 9 is a front view of the light guide film 402, and the lower view is a cross-sectional view of the upper cutting line IX-IX. As shown in FIG. 9, the light guide film 402 is made of the same material as that of the light guide film 40 and is formed in the same size. A circular hole 4021 (an example of a hole portion of the present disclosure) is formed substantially at the approximate center of the light guide film 402. An edge portion 4023 (inner peripheral edge) of the inner periphery of the hole 4021 is bent toward the light guide window 341. Specifically, the edge portion 4023 is bent so that the inner peripheral surface 4022 of the hole 4021 faces the light guide window 341. The edge portion 4023 is a portion to be inserted into the light guide window 341. In this way, the IR light L1 incident on the light guide film 402 and reaching the inner peripheral surface 4012 is polarized toward the light guide window 341 side in accordance with a taper angle of the inner peripheral surface 4022 and heads toward the light receiving sensor 51. In this way, the light receiving sensor 51 may efficiently receive the IR light L1.

Figure 10:
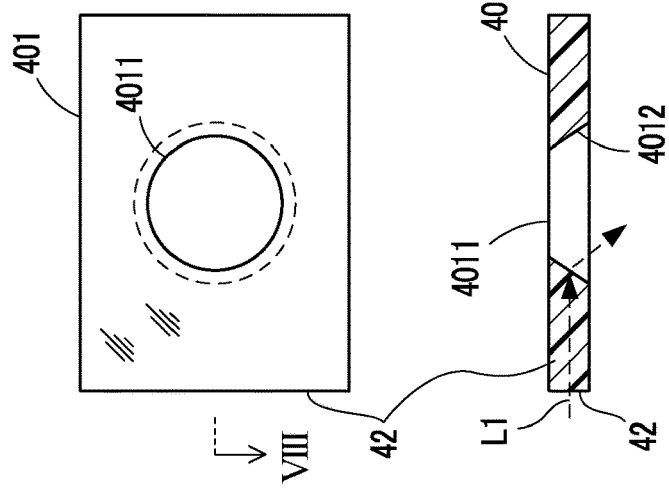
FIG. 10 is a view showing Modification Example 3 of the light guide film of the first embodiment.

In addition, instead of the light guide film 40, a light guide film 403 shown in FIG. 10 may be applied as Modification Example 3 of the light guide member. Here, the upper view of FIG. 10 is a front view of the light guide film 403, and the lower view is a cross-sectional view of the upper cutting line X-X. As shown in FIG. 10, the light guide film 403 is made of the same material as that of the light guide film 40 and is formed in the same size. Substantially at the approximate center of the light guide film 403, a swelling portion 4031 (an example of a swelling portion of the present disclosure) swelling in a protruding manner toward the light guide window 341 is provided. The swelling portion 4031 is a portion to be inserted into the light guide window 341. In this way, the IR light L1 incident on the light guide film 403 and reaching the swelling portion 4031 progresses toward a top portion 4032 along the curved shape of the swelling portion 4031, and when reaching the top portion 4032 of the swelling portion 4031, the IR light L1 is emitted from the top portion 4032 to the outside and heads toward the light receiving sensor 51. In this way, the light receiving sensor 51 may efficiently receive the IR light L1.

Figure 11:
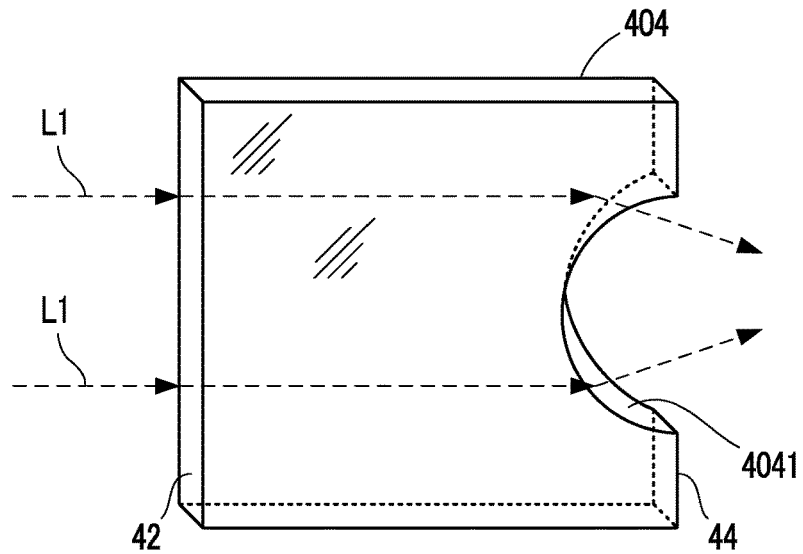
FIG. 11 is a view showing Modification Example 4 of the light guide film of the first embodiment.

In addition, instead of the light guide film 40, a light guide film 404 shown in FIG. 11 may be applied as Modification Example 4 of the light guide member. The light guide film 404 is made of the same material as the light guide film 40. The length of the light guide film 404 in the longitudinal direction is shorter than that of the light guide film 40. Specifically, an end surface 44 (an example of a second end of the present disclosure) on the side opposite to the end surface 42 is formed to have a length such that the end surface 44 reaches the center of the light guide window 341. In other words, the end surface 44 of the light guide film 404 is provided in the gap T1 so as to face the light guide window 341. In this way, the IR light L1 reaching the end surface 44 is emitted from the end surface 44 without leaking and progresses to the light guide window 341. In addition, in the light guide film 404, as shown in FIG. 11, a curved surface 4041 cut in a concave shape in a semicircular shape is formed at the center of the end surface 44. Therefore, the IR light L1 emitted from the curved surface 4041 converges toward the center point of the curved surface 4041 according to the curvature of the curved surface 4041. As a result, the light receiving sensor 51 may receive the IR light L1 more efficiently. By forming the curved surface 4041 to be inclined and tapered toward the light guide window 341, the illuminance of the IR light L1 on the light receiving surface 511 of the light receiving sensor 51 may be increased, and the IR light L1 may be received more efficiently.

Second Embodiment

Figure 12:
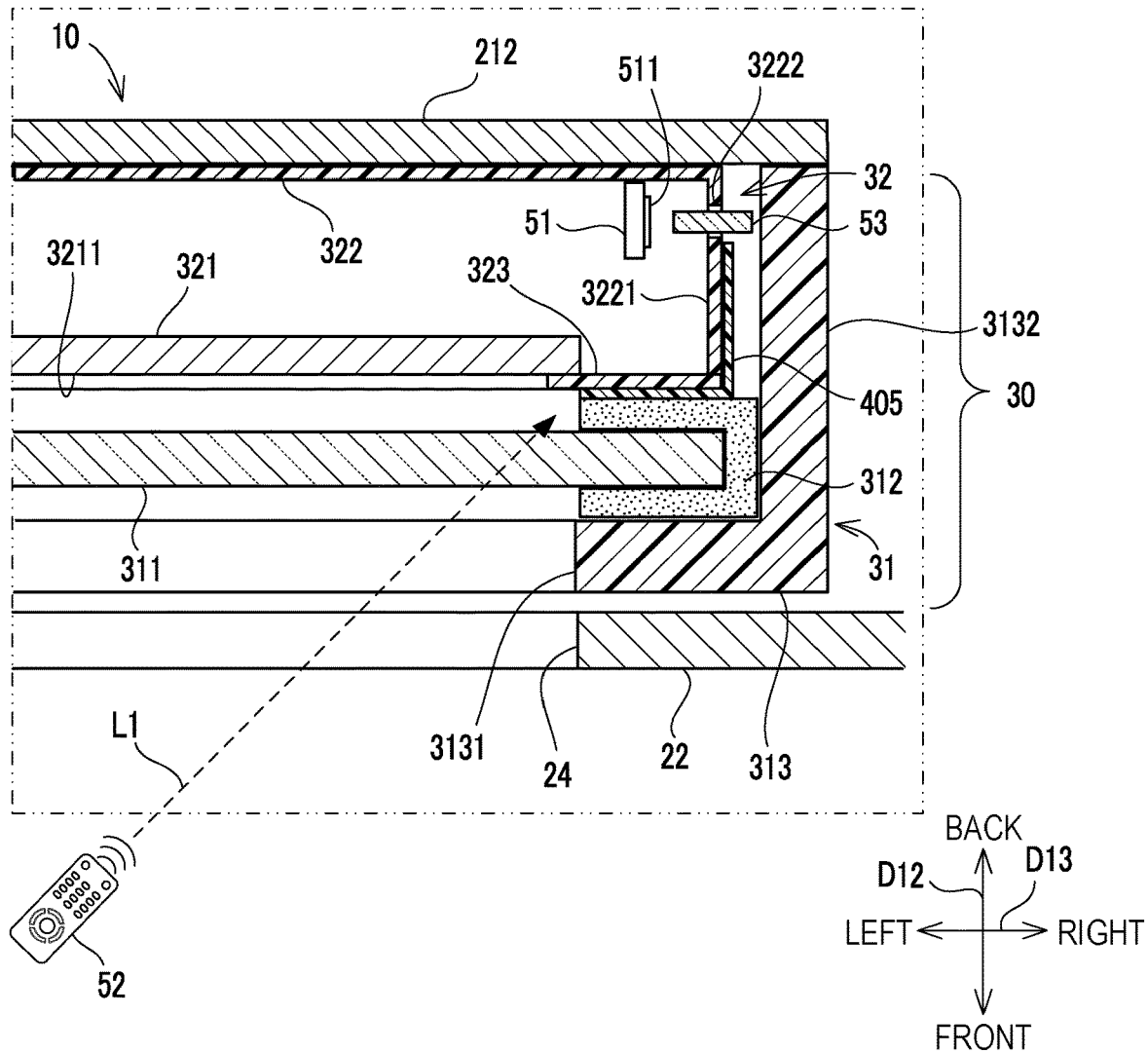
FIG. 12 is an enlarged view showing the periphery of a light guide film in a display guidance apparatus according to a second embodiment of the present disclosure.
Figure 13:
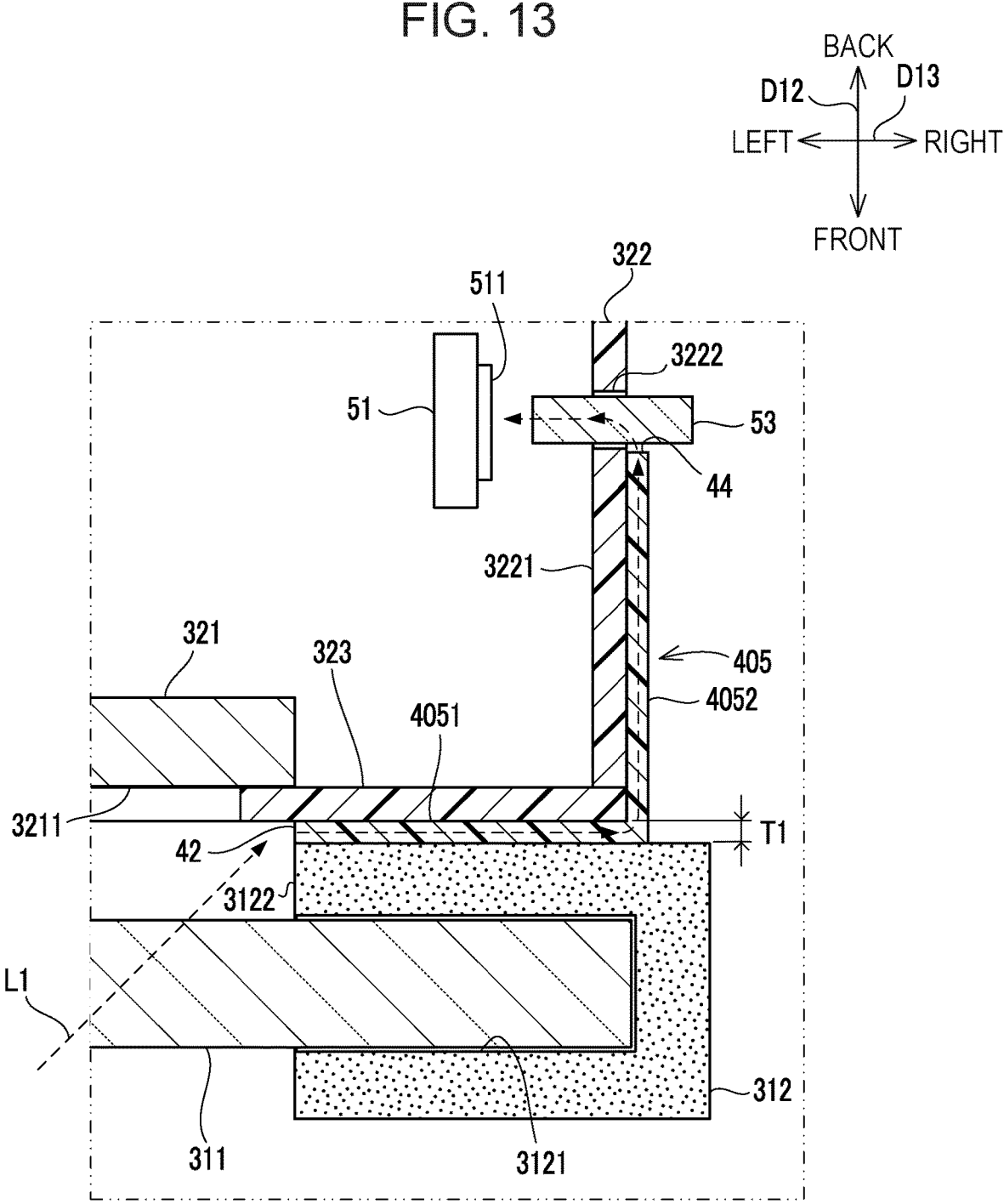
FIG. 13 is an enlarged view showing the progression of IR light incident on the light guide film of the second embodiment.

Hereinafter, a second embodiment of the present disclosure will be described with reference to FIGS. 12 and 13. FIG. 12 is an enlarged view showing the periphery of a light guide film 405 (an example of a light guide member of the present disclosure) in the display guidance apparatus 10 according to the present embodiment. FIG. 13 is an enlarged view showing the progression of the IR light incident on the light guide film 405. In this embodiment, the light receiving sensor 51 is provided on the back surface side inside the liquid crystal display apparatus 32. More specifically, the light receiving sensor 51 is provided near a right-side wall 3221 of the support frame 322. The light receiving surface 511 of the light receiving sensor 51 is not directed to the front surface side but directed to the right-side wall 3221.

A through-hole 3222 penetrating the right-side wall 3221 is formed on the back surface side of the right-side wall 3221. The light receiving sensor 51 is provided at a position facing the through-hole 3222. In the through-hole 3222, a rectangular block-shaped light guide member 53 (an example of an intermediate light guide member of the present disclosure) made of a transparent resin member is inserted. In the present embodiment, the light receiving unit of the present disclosure is realized by the light receiving sensor 51 and the light guide member 53.

The light guide member 53 is made of a transparent material and may be formed of the same material as the above-described light guide film 40, as long as the light guide member 53 may propagate the IR light L1 therein. The light guide member 53 extends to the light receiving surface 511, but the right end portion of the light guide member 53 is exposed to the outside of the right-side wall 3221, and in this state, the light guide member 53 is fixed to the through-hole 3222 by fitting or the like.

In the present embodiment, the light guide portion 34 of the above-described first embodiment is not provided, and instead of the light guide portion 34, the light guide film 405 is provided. The light guide film 405 is made of the same material as the light guide film 40. As shown in FIG. 13, the light guide film 405 has an L-shaped bent shape, a first light guide portion 4051 on one side having the end surface 42 is provided in the gap T1 and is sandwiched between the front casing frame 323 and the buffer member 312. The first light guide portion 4051 is adhered to the front surface side of the front casing frame 323 by, for example, an adhesive. On the other hand, a second light guide portion 4052 having the end surface 44 opposite to the end surface 42 extends backward along the right-side wall 3221, and the end surface 44 at the extending end thereof is close to the light guide member 53. In other words, the first light guide portion 4051 of the light guide film 405 is provided in the gap T1, the second light guide portion 4052 extends backward from the right end of the gap T1, and the end surface 44 is disposed in the vicinity of the light guide member 53.

With such a configuration, by operating the remote controller 52 toward the end surface 42, the IR light L1 emitted from the remote controller 52 is incident on the end surface 42, enters the inside of the light guide film 405, and reaches the end surface 44 through the first light guide portion 4051 and the second light guide portion 4052. The IR light L1 emitted from the end surface 44 is incident on the light guide member 53 and progresses inside the light guide member 53 toward the light receiving surface 511 side and heads toward the light receiving surface 511 from the end portion on the light receiving surface 511 side. In this way, the light receiving sensor 51 may efficiently receive the IR light L1.

Third Embodiment

Figure 14:
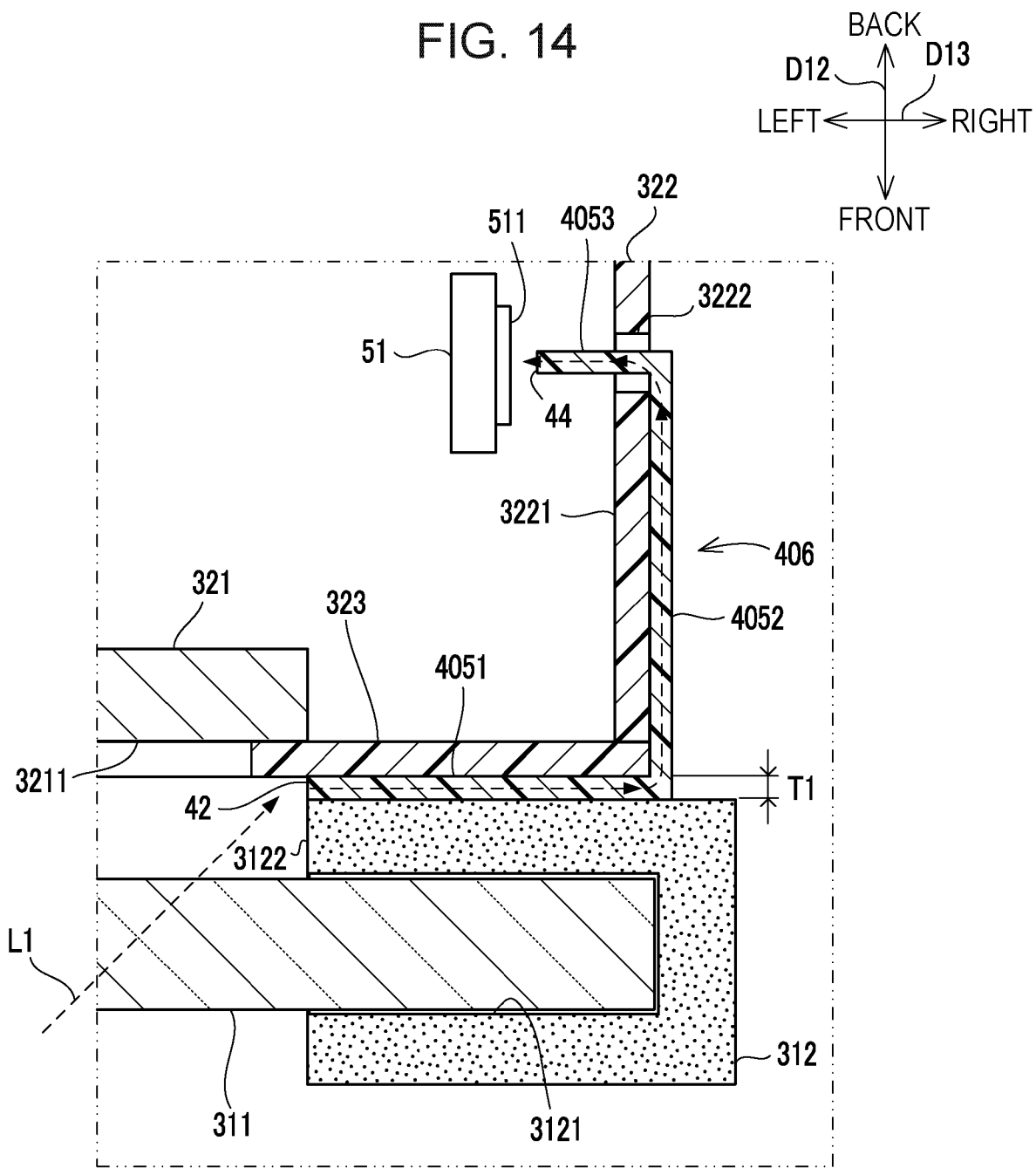
FIG. 14 is an enlarged view showing the periphery of a light guide film in a display guidance apparatus according to a third embodiment of the present disclosure.

Hereinafter, a third embodiment of the present disclosure will be described with reference to FIG. 14. FIG. 14 is an enlarged view showing the periphery of a light guide film 406 (an example of a light guide member of the present disclosure) in the display guidance apparatus 10 according to the present embodiment. The present embodiment is different from the above-described second embodiment in that the light guide member 53 is not provided, and the light guide film 406 having a third light guide portion 4053 is provided. The light guide film 406 has the above-described first light guide portion 4051 and the second light guide portion 4052, and further, the third light guide portion 4053 is provided continuously to the second light guide portion 4052. The third light guide portion 4053 is bent at a right angle from the second light guide portion 4052 to the left side and is inserted through the through-hole 3222. The end surface 44, which is the extended end of the third light guide portion 4053, is disposed in the vicinity of the light receiving surface 511 of the light receiving sensor 51.

With this configuration, the IR light L1 having entered the inside of the light guide film 406 sequentially passes through the first light guide portion 4051, the second light guide portion 4052, and the third light guide portion 4053 and progresses toward the end surface 44. Then, when reaching the end surface 44, the IR light L1 is emitted from the end surface 44 toward the light receiving surface 511. In this way, the light receiving sensor 51 may efficiently receive the IR light L1.

Fourth Embodiment

Figure 15:
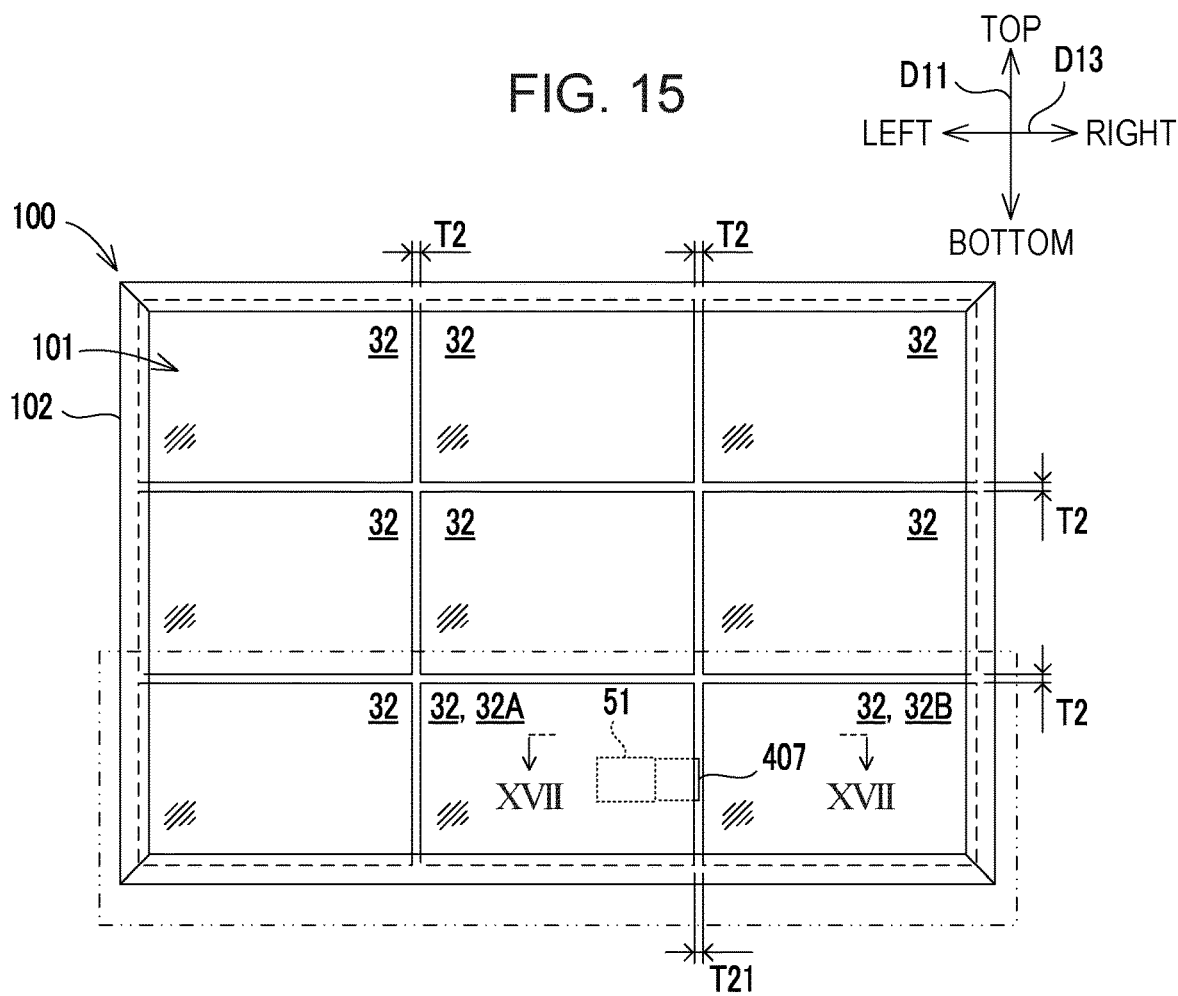
FIG. 15 is a schematic view showing a multi-display apparatus according to a fourth embodiment of the present disclosure.
Figure 16:
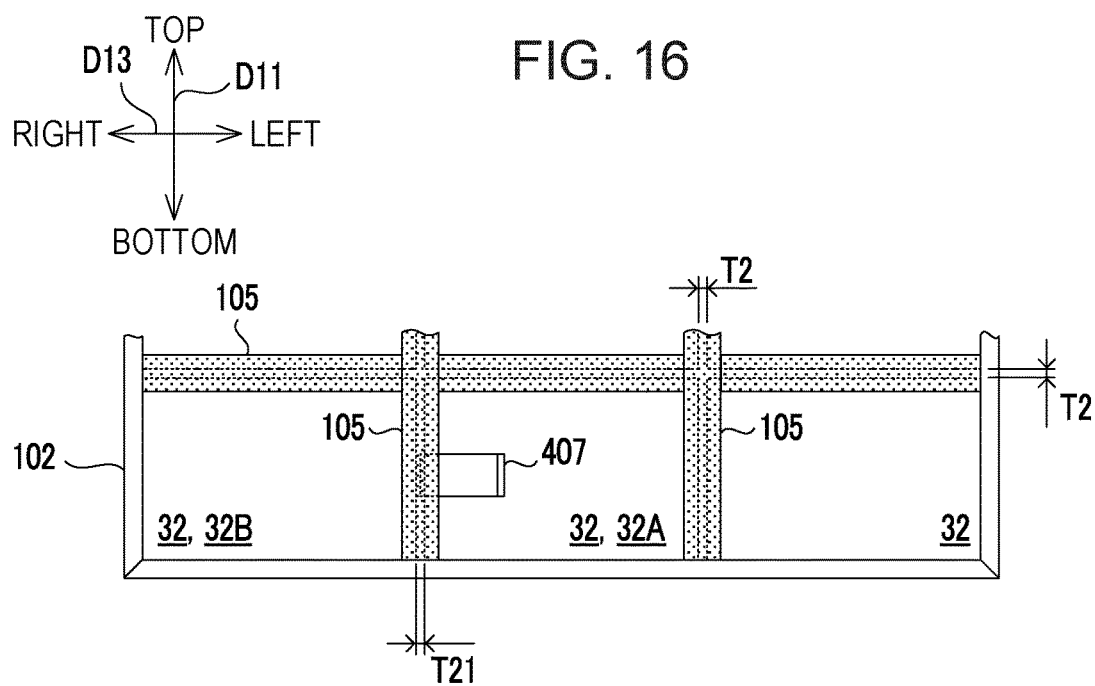
FIG. 16 is a schematic view showing a configuration of a lower part of the back surface of the multi-display apparatus.
Figure 17:
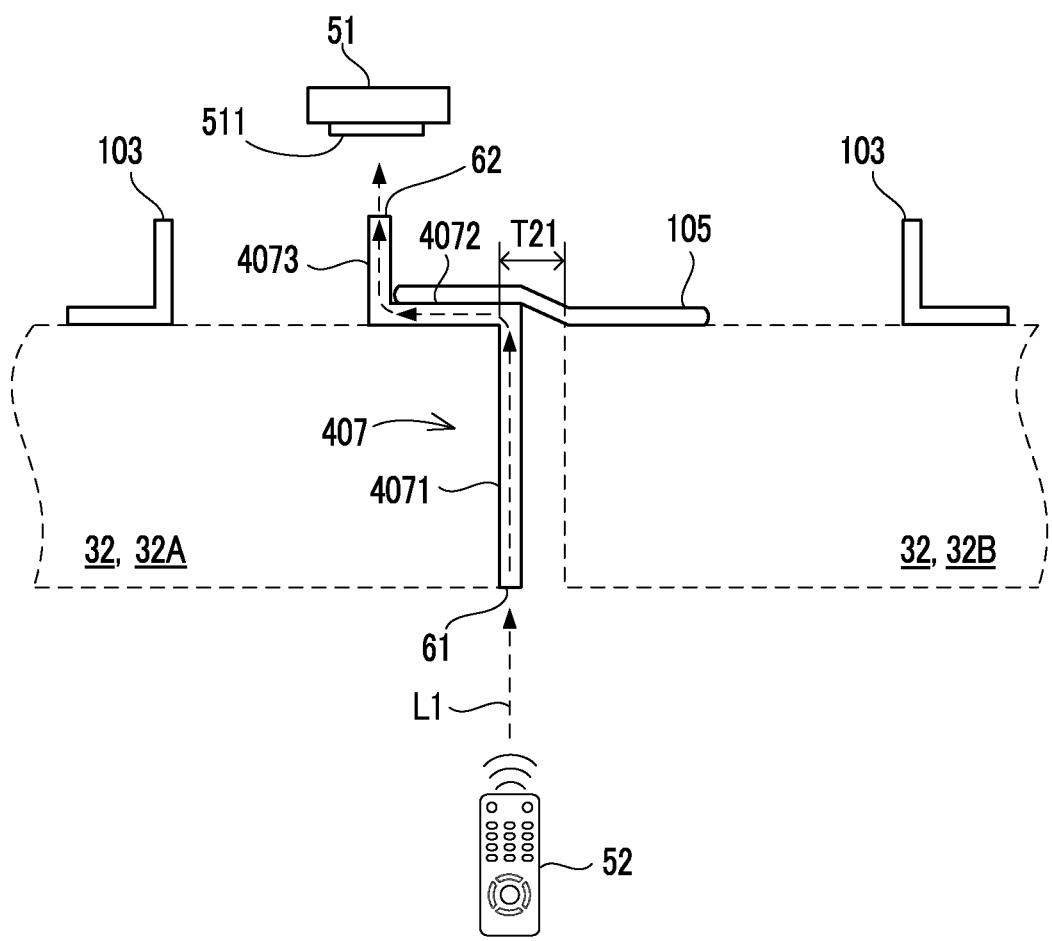
FIG. 17 is a schematic enlarged view showing the progression of a light guide film and IR light of the fourth embodiment.

Hereinafter, a fourth embodiment of the present disclosure will be described with reference to FIGS. 15 and 17. FIG. 15 is a schematic view showing a multi-display apparatus 100 according to the present embodiment. FIG. 16 is a schematic view showing a configuration of a lower portion of the back surface of the multi-display apparatus 100. FIG. 17 is a view seen from the direction of the arrow XVII-XVII in FIG. 15 and is a schematic enlarged view showing the light guide film 407 (an example of a light guide member of the present disclosure) of the multi-display apparatus 100 and the progression of the IR light L1.

The multi-display apparatus 100 is an apparatus that realizes a display screen 101 with a large screen by providing a plurality of liquid crystal display apparatus 32 adjacent to each other described in the first embodiment. In the multi-display apparatus 100, a total of nine liquid crystal display apparatus 32 forming the display screen 101 are used, three liquid crystal display apparatus 32 are arranged at equal intervals with a predetermined gap T2 in the top-bottom direction D11, and, three liquid crystal display apparatus 32 are arranged at equal intervals with the predetermined gap T2 in the left-right direction D13. The gap T2 is provided to prevent interference when the support frame 322 of the liquid crystal display apparatus 32 and the front casing frame 323 thermally expand.

A casing frame 102 is provided on the outer peripheral portion of the multi-display apparatus 100. The casing frame 102 supports a plurality of liquid crystal display apparatus 32 together with a frame 103 (see FIG. 17) provided on the back surface.

As shown in FIG. 16, a light shielding seal 105 (an example of a seal member of the present disclosure) for closing the gap T2 between the liquid crystal display apparatus 32 is attached to the back surface side of the multi-display apparatus 100. The light shielding seal 105 is formed of a material that shields light. The light shielding seal 105 prevents the image on the back surface side from appearing on the front surface side through the gap T2 of the display screen 101. In addition, it is possible to prevent the light that has reached the back surface side from being reflected by the peripheral member and leaking out to the front surface side of the display screen 101 through the gap T2.

In the present embodiment, the light receiving sensor 51 (see FIGS. 15 and 17) is provided on the back surface side of the multi-display apparatus 100. Specifically, in FIG. 15, the light receiving sensor 51 is provided on the back surface side of a liquid crystal display apparatus 32A (one example of a display unit of the present disclosure) located at the lower center. The light receiving sensor 51 is supported by a bracket or the like (not shown) in a state where the light receiving surface 511 thereof faces forward so as to face the back surface of the liquid crystal display apparatus 32A.

A liquid crystal display apparatus 32B (an example of an opposing body and a second display unit of the present disclosure) having the same configuration as the liquid crystal display apparatus 32A is disposed on the right side of the liquid crystal display apparatus 32A. A gap T21 similar to the gap T2 is also formed between the liquid crystal display apparatus 32A and the liquid crystal display apparatus 32B. That is, the liquid crystal display apparatus 32B is provided adjacent to the right side of the liquid crystal display apparatus 32A so as to form the gap T21 between the liquid crystal display apparatus 32B and the side surface of the liquid crystal display apparatus 32A.

The multi-display apparatus 100 is provided with a light guide film 407. The light guide film 407 is made of the same material as the light guide film 40 and is an elongated film member formed in a band shape. As shown in FIG. 17, an end surface 61 (an example of a first end of the present disclosure) on one side in the longitudinal direction of the light guide film 407 is exposed from the gap T21 to the front surface side of the display screen 101. The end surface 61 is disposed at the same plane as the display screen 101. The light guide film 407 extends to the back surface side through the gap T21, and the end surface 62 (an example of a second end of the present disclosure) opposite to the end surface 61 is disposed in the vicinity of the light receiving surface 511 of the light receiving sensor 51. The end surface 61 may slightly protrude from the front surface side of the display screen 101 as long as the aesthetic sensation from the front surface side of the multi-display apparatus 100 is not impaired.

As shown in FIG. 17, the light guide film 407 includes a first light guide portion 4071 disposed in the gap T21, a second light guide portion 4072 bent at a right angle to the first light guide portion 4071, and a third light guide portion 4073 further bent at a right angle backward to the second light guide portion 4072. The first light guide portion 4071 extends backward with the gap T21, and the second light guide portion 4072 extends to the left side along the back surface of the liquid crystal display apparatus 32A. Then, the third light guide portion 4073 extends toward the light receiving surface 511 of the light receiving sensor 51. The end surface 62, which is the extending end of the third light guide portion 4073, reaches a position close to the light receiving surface 511. The light shielding seal 105 is attached so as to overlap with the surface of the second light guide portion 4072 and close the gap T21 on the back surface side.

With this configuration, the IR light L1 having entered the inside of the light guide film 407 from the end surface 61 sequentially passes through the first light guide portion 4071, the second light guide portion 4072, and the third light guide portion 4073 and progresses toward the end surface 62. Then, when reaching the end surface 62, the IR light L1 is emitted from the end surface 62 toward the light receiving surface 511. In this way, the light receiving sensor 51 may efficiently receive the IR light L1.

Figure 18:
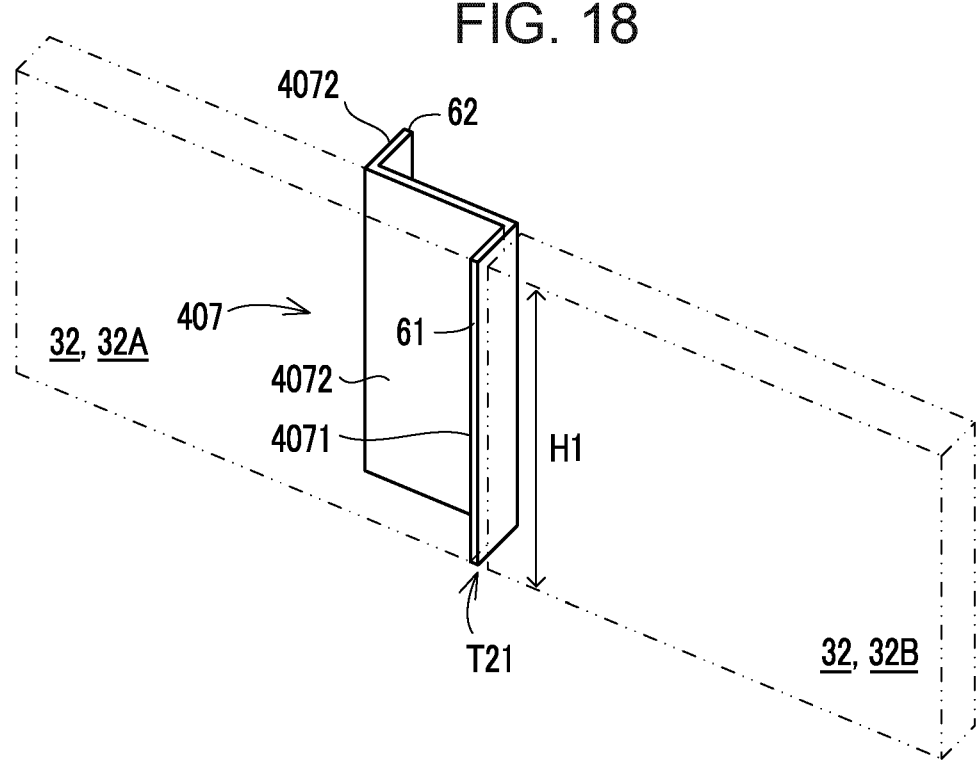
FIG. 18 is a view showing Modification Example 5 of the light guide film of the fourth embodiment.

In the above-described fourth embodiment, the light guide film 407 is exemplified as an example of a light guide member of the present disclosure, but the light guide member of the present disclosure is not limited to this configuration. For example, as shown in FIG. 18, the light guide film 407 may be formed to have the same size as a height size H1 in the top-bottom direction D11 in the gap T21. In this case, the end surface 61 exposed to the front surface side from the gap T21 exists in a wide range in the top-bottom direction D11, making it easier for the IR light L1 from the remote controller 52 to be received. In addition, the end surface 61 becomes less conspicuous on the display screen 101 when the end surface 61 exists in the entire area in the top-bottom direction D11 in the gap T21 than when the end surface 61 appears partially in the gap T21.

Figure 19:
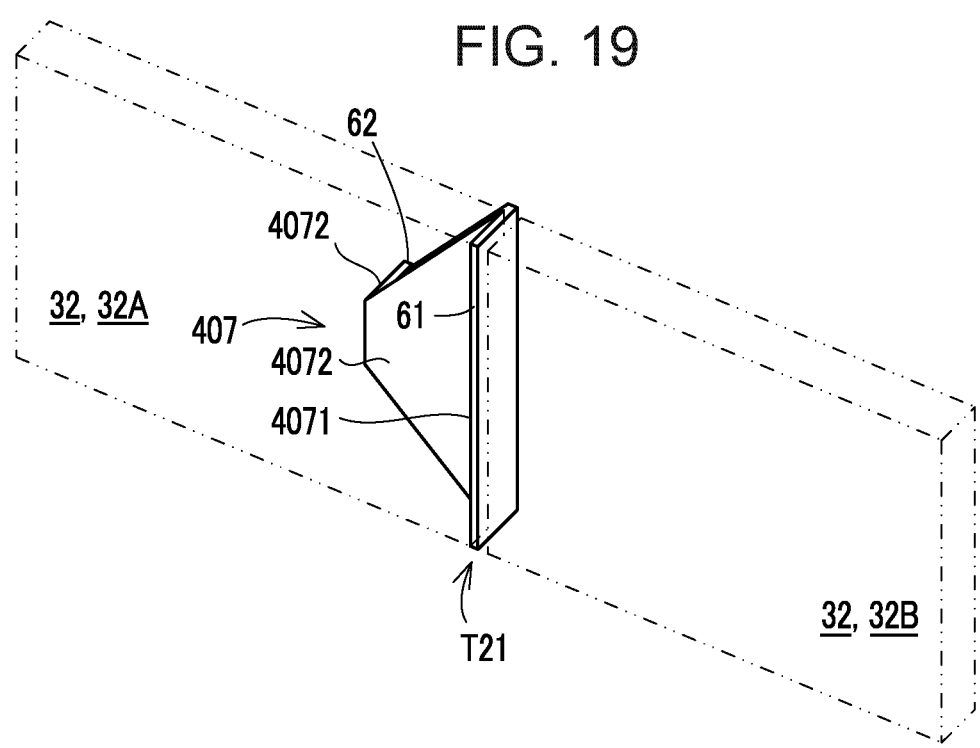
FIG. 19 is a view showing Modification Example 6 of the light guide film of the fourth embodiment.

In addition, for example, as shown in FIG. 19, in the light guide film 407, the first light guide portion 4071 may be formed to have the same size as the height size H1, the third light guide portion 4073 may be formed to have a size smaller than the height size H1, and the second light guide portion 4072 may be formed in a tapered shape extending from the first light guide portion 4071 to the third light guide portion 4073. In this case, the end surface 61 on the display screen 101 becomes less conspicuous, and the IR light L1 incident on the end surface 61 converges at the second light guide portion 4072 and is emitted from the end surface 62. Therefore, the light receiving sensor 51 may efficiently receive the IR light L1.

Fifth Embodiment

Figure 20:
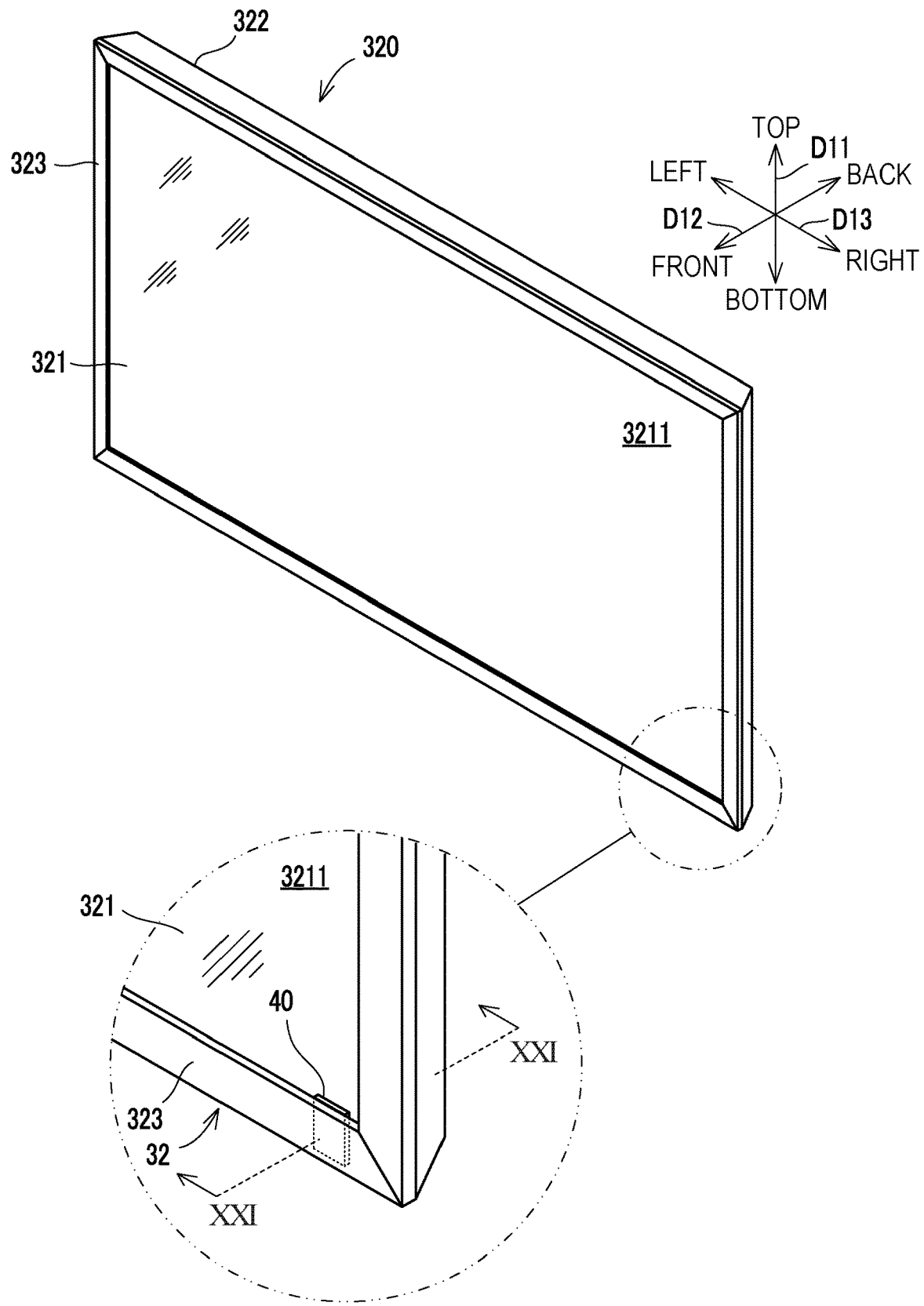
FIG. 20 is a perspective view showing a liquid crystal display apparatus according to a fifth embodiment of the present disclosure.
Figure 21:
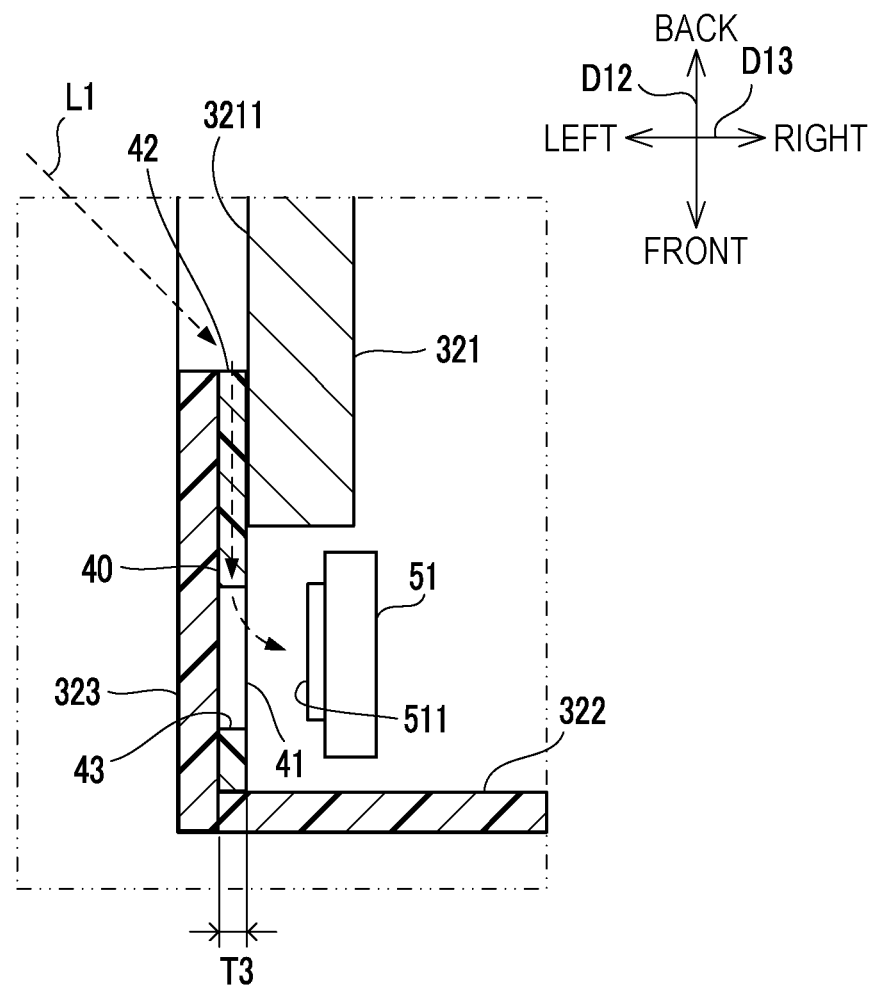
FIG. 21 is a cross-sectional view showing the cross-sectional structure of a cut surface XXI-XXI in FIG. 20 and the progression of IR light in a light guide film of the fifth embodiment.

Hereinafter, a fifth embodiment of the present disclosure will be described with reference to FIGS. 20 and 21. FIG. 20 is a perspective view showing a liquid crystal display apparatus 320 (an example of a display apparatus of the present disclosure) according to the present embodiment. FIG. 21 is a cross-sectional view showing a sectional structure of the cut surface XXI-XXI of FIG. 20.

The liquid crystal display apparatus 320 as shown in FIG. 20 is a display apparatus in which the liquid crystal display apparatus 32 of the above-described first embodiment is oriented sideways and is a display apparatus that displays an image output from an information processing device, for example. This liquid crystal display apparatus 320 differs from the liquid crystal display apparatus 32 in that the light guide window is not formed in the front casing frame 323, and the light guide film 40 is disposed with gap T3 between the front casing frame 323 and the display surface 3211 as shown in FIG. 21. The front casing frame 323 is disposed so as to face the peripheral edge of the display surface 3211 with the gap T3 therebetween. Therefore, in the present embodiment, the front casing frame 323 is an example of an opposing body of the present disclosure.

With such a configuration, by operating the remote controller 52 toward the end surface 42 exposed from the gap T3, the IR light L1 emitted from the remote controller 52 may be incident on the end surface 42. Then, the IR light L1 incident on the end surface 42 passes through the inside of the light guide film 40, reaches the inner peripheral surface 43, and is emitted from the inner peripheral surface 43. The IR light L1 emitted from the inner peripheral surface 43 may be received by the light receiving surface 511 of the light receiving sensor 51.

The present disclosure contains subject matter related to that disclosed in Japanese Priority Patent Application JP 2017-162105 filed in the Japan Patent Office on Aug. 25, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus comprising:
a display unit that includes a display panel for displaying an image on a display surface;
a transparent protective plate that is disposed to face a front side of the display unit so as to form an internal space on the display surface;
a light receiving unit that is capable of receiving light emitted from a remote controller;
an opposing body that is disposed at an outer peripheral portion of the transparent protective plate and to face an outer peripheral portion of the display unit with a gap between the opposing body and the outer peripheral portion of the display unit; and
a film-like light guide member that is provided in the gap and extends toward the light receiving unit,
wherein a first end of the light guide member on one side of an extending direction is exposed from the gap to the internal space at the display surface side.

2. The display apparatus according to claim 1,
wherein the display unit includes a casing frame provided so as to surround a peripheral edge of a front surface side of the display panel and having a light guide window for guiding light to the light receiving unit,
the opposing body is disposed so as to cover the light guide window of the casing frame and to form the gap between the opposing body and a front surface side of the casing frame, and
the light guide member is provided in the gap and is provided in the vicinity of the light guide window.

3. The display apparatus according to claim 2,
wherein the light guide member is provided in the gap so as to cover the light guide window.

4. The display apparatus according to claim 3,
wherein the light guide member includes a hole portion formed at a position corresponding to the light guide window.

5. The display apparatus according to claim 4,
wherein an inner peripheral surface of the hole portion is formed in a divergent shape toward the light guide window in a thickness direction of the light guide member.

6. The display apparatus according to claim 4,
wherein an inner peripheral edge of the hole portion is formed in a shape bent toward the light guide window.

7. The display apparatus according to claim 4,
wherein the hole portion is formed in a circular shape.

8. The display apparatus according to claim 3,
wherein the light guide member includes a swelling portion swelling in a protruding manner toward the light guide window.

9. The display apparatus according to claim 2,
wherein the light guide member is provided in the gap so that a second end opposite to the first end faces the light guide window.

10. The display apparatus according to claim 9,
wherein the second end is formed in a semicircular shape.

11. The display apparatus according to claim 1,
wherein the display unit includes a casing frame provided so as to surround a peripheral edge of a front surface side of the display panel,
the light receiving unit is provided on a back surface side of the display unit,
the opposing body is disposed so as to form the gap between the opposing body and a front surface side of the casing frame, and
the light guide member extends from the gap toward the light receiving unit and a second end opposite to the first end is disposed in the vicinity of a light receiving surface of the light receiving unit.

12. The display apparatus according to claim 11, wherein the light receiving unit includes an intermediate light guide member for guiding incident light to the light receiving unit, and the second end of the light guide member is disposed in the vicinity of the intermediate light guide member.

13. The display apparatus according to claim 1, wherein the opposing body includes a buffer member having elasticity for covering the outer peripheral portion of the transparent protective plate, and a casing that supports the transparent protective plate and the display unit in a state where the buffer member is in contact with a peripheral edge of a front surface side of the display unit, and the light guide member is provided between the peripheral edge of the front surface side of the display unit and the buffer member.

14. The display apparatus according to claim 13, further comprising:

an outer housing that supports the casing in a state of accommodating the casing therein and includes an opening for exposing the display surface of the display unit to the outside.

15. The display apparatus according to claim 1, wherein the opposing body is a second display unit that is provided adjacent to a side of the display unit so as to form the gap between the opposing body and a side surface of the display unit and has the same configuration as the display unit, the light receiving unit is provided on a back surface side of the display unit and the second display unit, and the first end of the light guide member is exposed to a front surface side from the gap and extends to a back surface side through the gap, and a second end opposite to the first end is disposed in the vicinity of a light receiving surface of the light receiving unit.

16. The display apparatus according to claim 15, wherein the light guide member is bent along the back surface of the display unit and the second display unit, and the display apparatus further comprises: a seal member that closes the gap on the back surface of the display unit and the second display unit.

* * * * *